United States Patent [19]

Nomura et al.

[11] Patent Number: 4,860,191
[45] Date of Patent: Aug. 22, 1989

[54] COPROCESSOR WITH DATAFLOW CIRCUITRY CONTROLLING SEQUENCING TO EXECUTION UNIT OF DATA RECEIVED IN TOKENS FROM MASTER PROCESSOR

[75] Inventors: Masahiro Nomura; Yukio Maehashi, both of Tokyo, Japan

[73] Assignee: NEC Corporation, Tokyo, Japan

[21] Appl. No.: 894,535

[22] Filed: Aug. 8, 1986

[30] Foreign Application Priority Data

Aug. 8, 1985 [JP] Japan ............................... 60-175117
Dec. 20, 1985 [JP] Japan ............................... 60-288788

[51] Int. Cl.4 ...................... G06F 15/16; G06F 15/20; G06F 13/38
[52] U.S. Cl. .................................................. 364/200
[58] Field of Search ... 364/200 MS File, 900 MS File

[56] References Cited

U.S. PATENT DOCUMENTS 4,149,244  4/1979  Anderson ............................ 364/200
4,215,399  7/1980  Pavicic ............................... 364/200
4,438,488  3/1984  Shibayama et al. ................ 364/200
4,467,412  8/1984  Hoff .................................... 364/200
4,482,950  11/1984 Dshkhunian ........................ 364/200
4,491,907  1/1985  Koeppen ............................. 364/200

Primary Examiner—Archie E. Williams, Jr.
Assistant Examiner—Emily Y. Chan
Attorney, Agent, or Firm—Sughrue, Mion, Zinn, Macpeak & Seas

[57] ABSTRACT

An information processing apparatus with a dual processor system contains a general purpose processor for processing a required program and a special purpose processor for processing a specific operation in the required program. The special purpose processor is designed according to a data flow architecture and executes a task according to a token prepared by the general purpose processor, the token having sequence control information and data to be processed. The architecture employed enables placement of both the general purpose processor and the single purpose processor on a single semiconductor chip, and also enables asynchronous, parallel operation of the two processors.

5 Claims, 7 Drawing Sheets

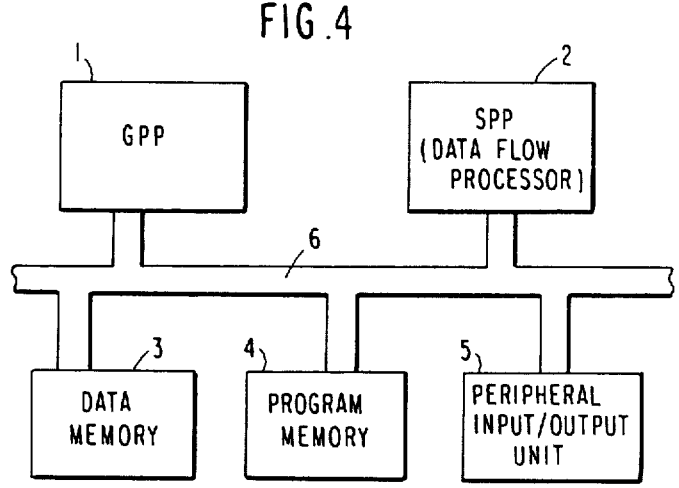
FIG.4
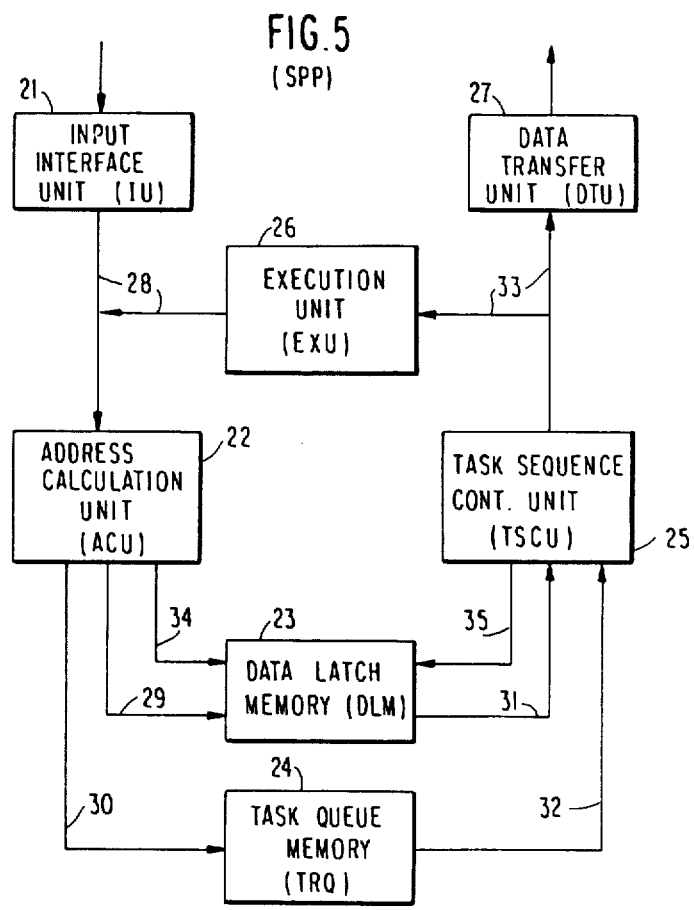

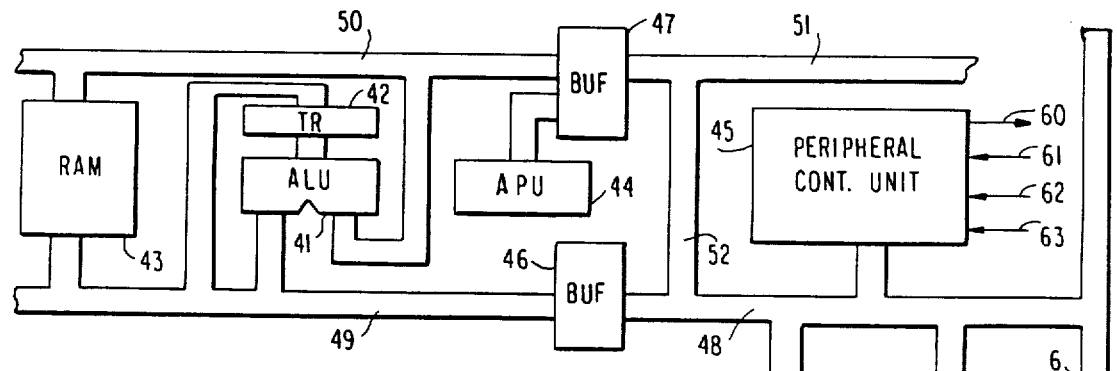
FIG.6 (GPP)
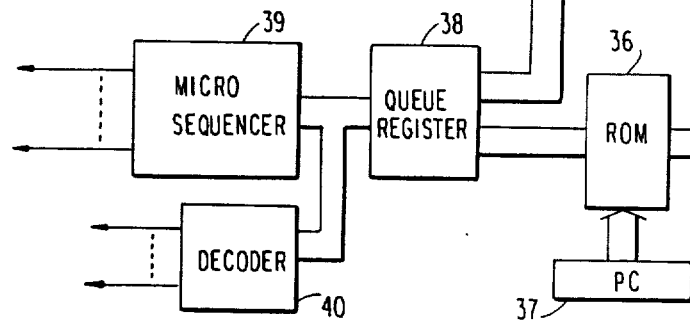
FIG.7
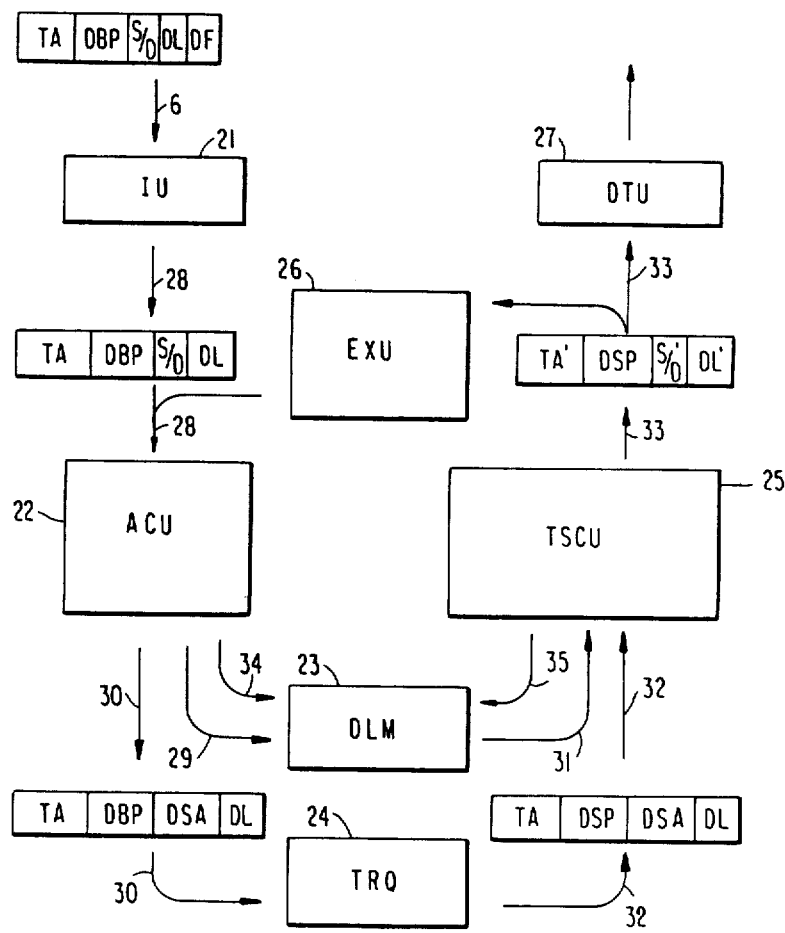

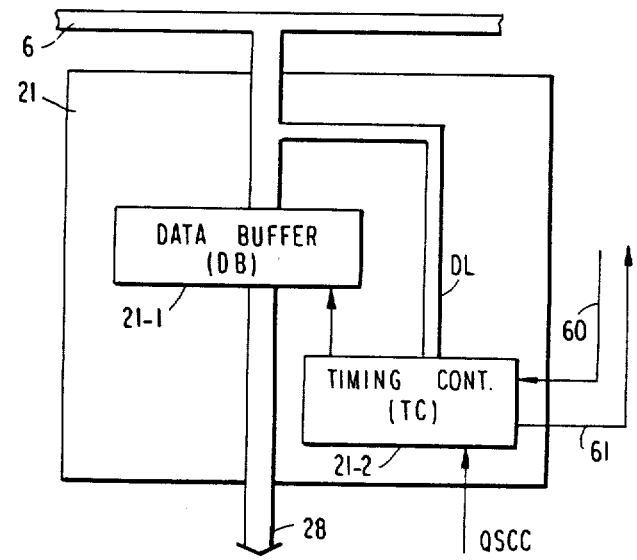
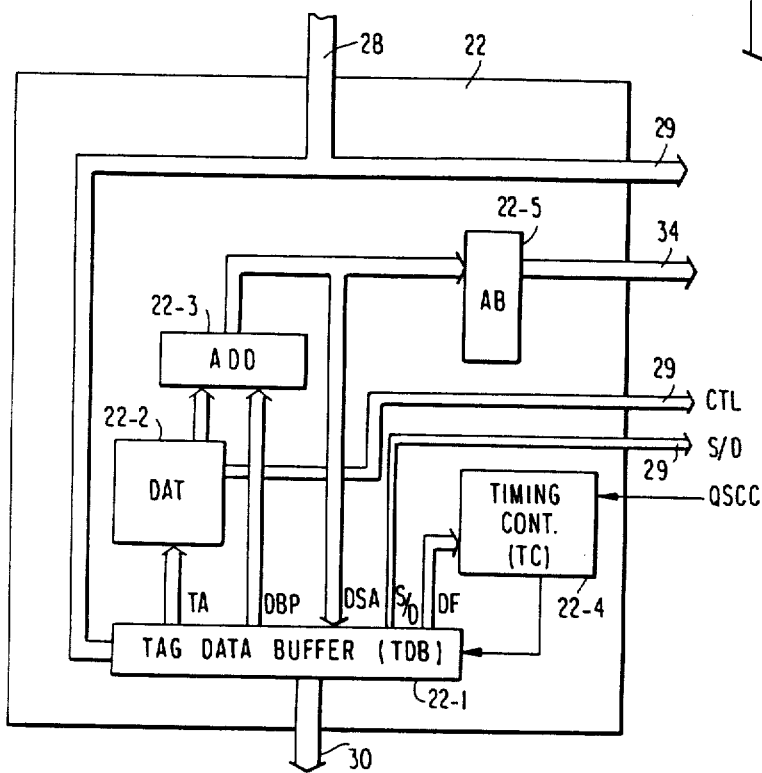
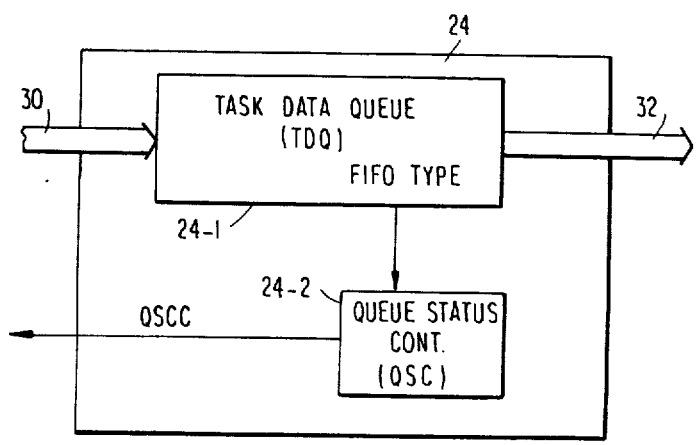

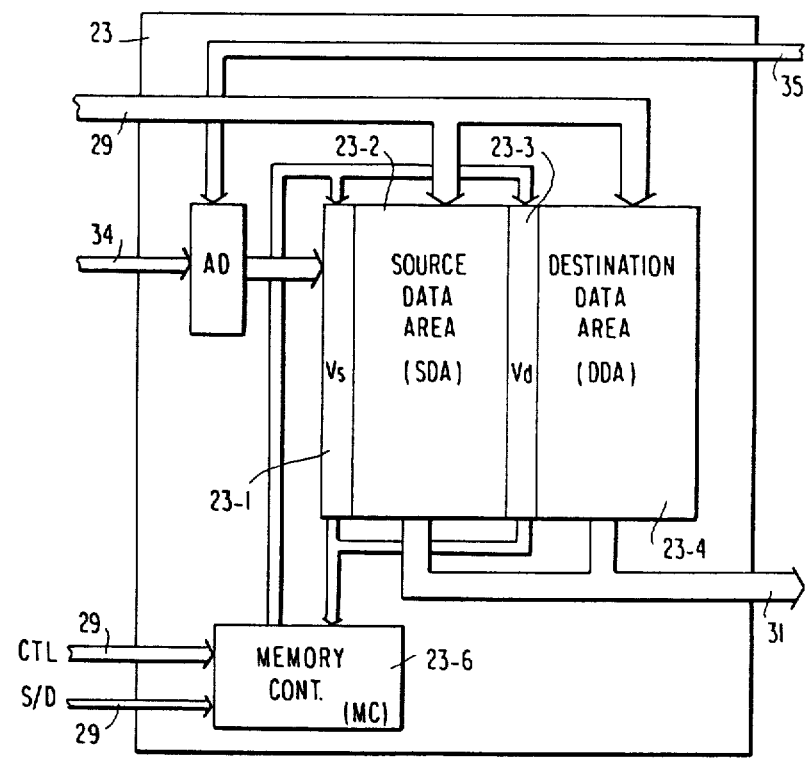
FIG.11 (DLM)
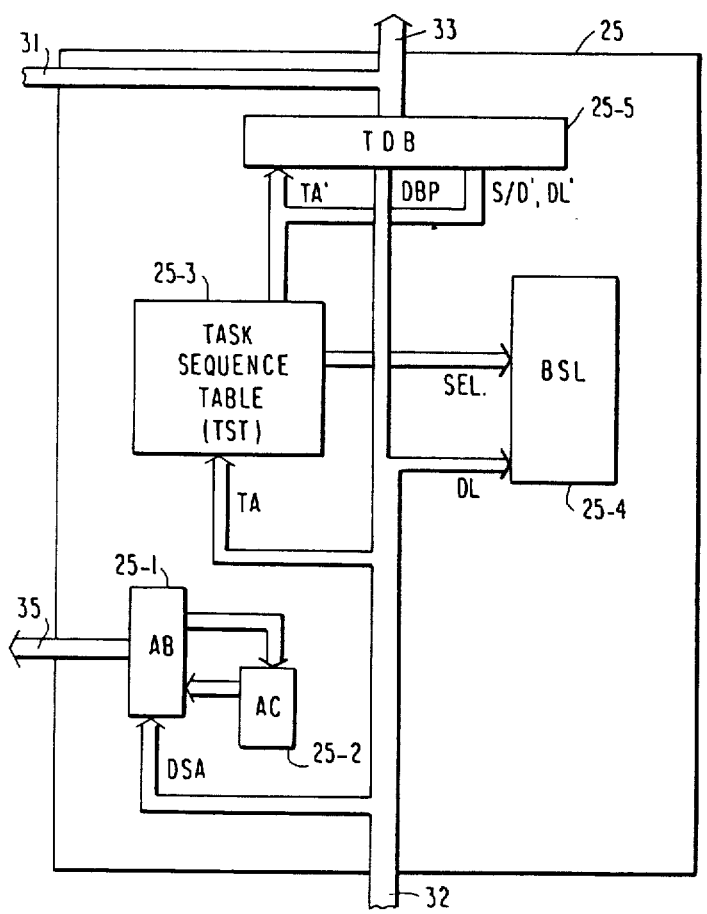
FIG.12 (TSCU)

(EXU)

(DTU)

FIG.16
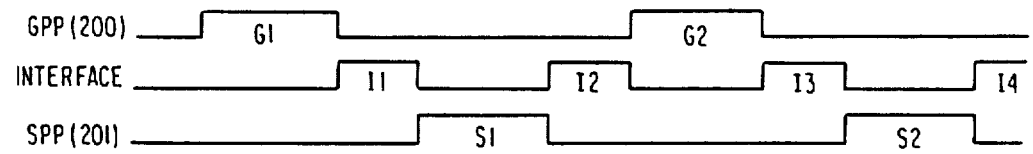
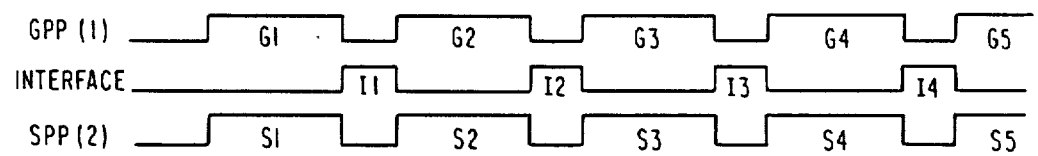
FIG.17
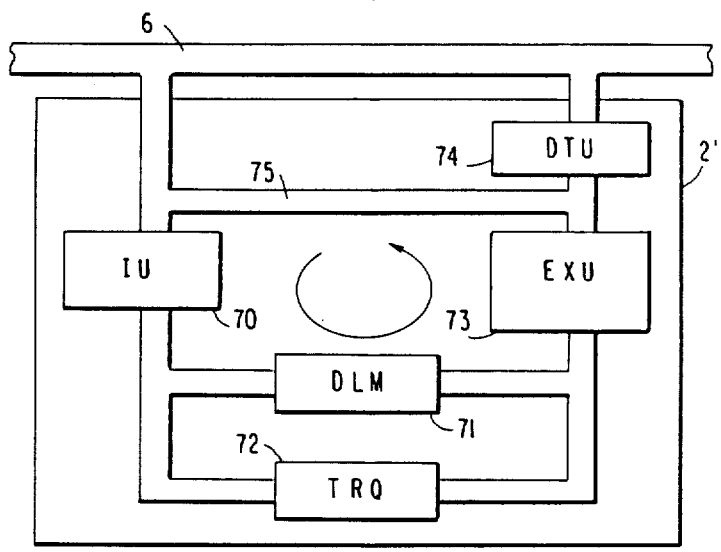

COPROCESSOR WITH DATAFLOW CIRCUITRY CONTROLLING SEQUENCING TO EXECUTION UNIT OF DATA RECEIVED IN TOKENS FROM MASTER PROCESSOR

BACKGROUND OF THE INVENTION

The present invention relates to an information processing apparatus of a dual processor system having a general purpose processor and a special purpose processor.

DESCRIPTION OF THE PRIOR ART

With the developments in semiconductor techniques and system architecture techniques, microcomputers have made remarkable progress in recent years in both function and performance, and some of such microcomputers are comparable to conventional so-called "minicomputers". Microcomputers include a general purpose processor which is designed according to standard microcomputer architecture and is used in many application fields. However, in some application fields which require a high-speed operation or a real time operation, such as engine control of a vehicle, motor control of a robot, and numerical control, it is difficult to process a required complex program by using only a single general purpose processor. Therefore, in those fields, a dual processor system is usually employed, wherein the general purpose processor is used as a host processor to control a processing sequence or a processing flow of a system. However, specific processing is usually required in the system, such as numeric processing, transaction processing, and data transmission processing. Further, the specific processing must be performed at high speed in real time operation. In addition, a large amount of data is to be manipulated in the specific processing. Therefore, the special purpose processor is used to perform the specific processing in a required program. A numeric processor or an I/O processor is known as a special purpose processor and is used as a co-processor or a slave-processor in the dual processor system. The conventional special purpose processors are all designed according to the von Neumann architecture. That is, the special-purpose co-processor or slave-processor is basically similar to the general purpose processor. The special purpose processor is different from the general purpose processor only in an arithmetic operation function or in an input-output function. For instance, one of the special purpose processors is designed so as to be applied to an arithmetic operation of variable bit length. In this case, an arithmetic logic unit (ALU) with a long bit length is employed. Further, the other special purpose processor contains two ALUs for executing a floating-point operation. However, these processors require a long period of time to perform the above-mentioned specific processing, with operating timing different from that of the general purpose processor. Therefore, the general purpose processor must always supervise the operation of the special purpose processor, so that the general purpose processor cannot execute the required program when the special purpose processor is executing the specific processing.

Further, the special purpose processor is basically designed according to the stored program architecture as described above. As a result, the required specific processing cannot be enabled until all of the data to be processed are entered into the special purpose processor. For example, if $A \times B + C \times D$ is to be executed as the specific processing, the special purpose processor cannot start the calculation until all of A, B, C and D are entered thereinto. If C and D are entered into the special purpose processor earlier than the entry of A and B, the calculation cannot be started until both the data A and B are entered. A, B, C and D are entered into the special purpose processor under the control of the general purpose processor. Therefore, the queuing time in the special purpose processor becomes long, so that the performance of the special purpose processor is reduced.

Furthermore, the special purpose processor requires a complex ALU with a large size and therefore cannot be formed on the same chip as the general purpose processor. As a result, the conventional dual processor system includes separate chips for the special purpose processor and the general purpose processor. Further, the two chips are connected by a connector whose dimensions are by no means negligible compared with the size of the two chips, thus making it difficult to satisfy the criterion of small size.

Moreover, where a high-level processor is used as the special purpose processor in which a program of the specific processing can be performed by itself, a complex interface circuit is required to arbitrate bus coupling between the general purpose processor and the special purpose processor.

It is therefore an object of the present invention to provide an information processing apparatus having a general purpose processor and a special purpose processor, in which timing control can be simplified.

Another object of the present invention is to provide an information processing apparatus wherein both a general purpose processor and a special purpose processor can be formed on a single semiconductor chip.

Yet another object of the present invention is to provide an information processing apparatus employing a dual processor system suitable for a high-speed operation or a real time operation.

Still another object of the present invention is to provide an improved special purpose processor which can be used as a co-processor or a slave processor.

SUMMARY OF THE INVENTION

An information processing apparatus of the present invention has a general purpose processor and a special purpose processor, characterized in that a data flow processor is used as the special purpose processor and is designed according to pipeline control architecture with a token ring bus. The general purpose processor prepares a plurality of tokens, each token having sequence control information and data to be processed, and supplies each token to the data flow processor as a co-processor or a slave-processor in a random order through a bus coupling the general purpose processor to the data flow processor. The data flow processor handles data inputted in a random and unscheduled manner on the basis of the sequence control information of the supplied token according to the data flow sequence. The data flow processor executes required special processing in a manner asynchronous with the operation of the general purpose processor, so that the general purpose processor need not supervise the processing status of the special purpose processor and may execute a given program in parallel with the special processing in the data flow processor.

The data flow processor as the special purpose processor sends a data transfer request signal to the general purpose processor after the special processing has been terminated and sends the result of the special processing to the general purpose processor in response to a data transfer acknowledge signal which is returned from the general purpose processor.

According to the present invention, the general purpose processor can operate the program independent of the special processing when the special purpose processor executes the special processing. Further, the general purpose processor can randomly supply unscheduled tokens to the special purpose processor. Thus, a queuing time of data to be processed can be remarkably reduced.

The data flow processor of the present invention is featured in that the data and the sequence control information contained in each token are separately stored in different first and second memories, respectively. The first memory is used to store the data only, while the second memory is used to store the sequence control information only. Further, the first memory contains two storage areas; that is, a source data area and a destination data area. A source data/destination data pair is required to execute a dyadic operation. The first memory further has a first flag portion, while the second memory has a second flag portion. The first flag portion stores a "1" when the corresponding source data is stored in the source data area, while the second flag portion stores a "1" when the corresponding destination data is stored in the destination data area. The data of each token is classified and stored in either the source data area or the destination data area according to a source/destination designating bit included in the sequence control information in each token. Thus the first memory is used as a queue memory. When both the source flag portion and the destination flag portion are "1", the source data and the destination data are simultaneously read out from the same address. When either the source flag portion or the destination flag portion is "0", the first memory does not perform a read operation. Thus, even if data are randomly entered into the special purpose processor, the dyadic operation is accurately executed according to the source and destination flag bits.

Moreover, an interface control between the general purpose processor and the special purpose processor is simplified and is performed without any complex hardware means. Further, the special purpose processor requires neither complex arithmetic means nor complex input/output means. Therefore, the special purpose processor can be easily formed on the same chip as the general purpose processor chip.

BRIEF DESCRIPTION OF THE DRAWINGS

FIG. 4 is a block diagram of a dual processor system according to an embodiment of the present invention.

FIG. 5 is an internal block diagram of a special purpose processor (SPP) of FIG. 4.

FIG. 6 is an internal block diagram of a general purpose processor (GPP) of FIG. 4.

FIG. 7 illustrates a token flow in the special purpose processor shown in FIG. 5.

FIG. 8 is a block diagram of an input interface unit (IU) in the special purpose processor shown in FIG. 5.

FIG. 9 is a block diagram of an address calculation unit (ACU) in the special purpose processor of FIG. 5.

FIG. 10 is a block diagram of a task queue memory (TRQ) in the special purpose processor of FIG. 5.

FIG. 11 is a block diagram of a data latch memory (DLM) in the special purpose processor of FIG. 5.

FIG. 12 is a block diagram of a task sequence control unit (TSCU) in the special purpose processor of FIG. 5.

FIG. 16 is a timing chart in operation of the system shown in FIG. 15.

FIG. 17 is an internal block diagram of a special purpose processor according to another embodiment of the present invention.

DETAILED DESCRIPTION OF THE PREFERRED EMBODIMENTS

The principles of the present invention now will be explained, first of all with reference to conventional techniques.

Figure 1:
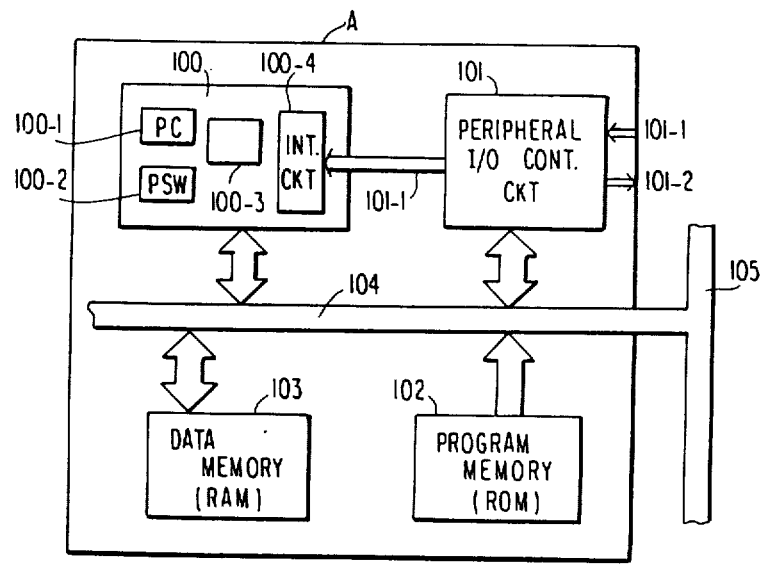
FIG. 1 is a block diagram of a conventional single chip microcomputer.

Referring to FIG. 1, a conventional single-chip microcomputer A comprises a central processing unit (CPU) 100, a peripheral I/O control circuit 101, a read-only program memory (ROM) 102, a random access data memory (RAM) 103, and an internal bus 104. The CPU 100 includes a program counter 100-1 (hereinafter called "PC"), a program status word register (hereinafter called "PSW") 100-2, a general purpose register set 100-3 and an interrupt control circuit 100-4. The interrupt control circuit 100-4 accepts an interrupt request signal 101-1 from the peripheral I/O control circuit 101 and controls the interrupt processing of the CPU 100. The program memory 102 stores an interrupt execution command and commands for a required program, and the data memory 103 stores data. They are connected to each other by the internal bus 104 which is coupled to an external bus 105. The CPU 100 reads out commands from the program memory 102 whose addresses are designated by the PC 100-1, and sequentially executes the commands.

In the actual control, the input portion 101-1 of the peripheral I/O control circuit 101 is coupled to various sensors, while its output portion 101-2 is coupled to a utilization device such as a driving circuit for a motor. When data is inputted from the various sensors to the peripheral I/O control circuit 101, the peripheral I/O control circuit 101 informs the interrupt control circuit 100-4 of the occurrence of interruption by sending the interrupt request signal 101-1. Upon receiving the interrupt request signal, the CPU 100 stores the concurrent contents of PC 100-1, PSW 100-2 and the general purpose register set 100-3 in a stack area (not shown) and executes the specific processing corresponding to the interruption. In accordance with the interruption processing program, the CPU 100 receives the data to be processed from the peripheral I/O control circuit 101, calculates the received data and outputs the result of calculation to the peripheral I/O control circuit 101.

After the specific processing is completed, the CPU 100 returns the contents of the stack area into PC 100-1, PSW 100-2 and the general purpose register set 100-3, respectively, and restarts the main routine.

Where the conventional single-chip microcomputer is applied to a field in which many specific processings are required, each specific processing(the input/output processing and calculation processing)must be executed under the interruption operation. Particularly, in the "high end" application field, these specific processings must be executed at a high speed or as a real time operation, and a large amount of data must be processed.

In the conventional single-chip microcomputers, however, the data input/output processing and the numeric calculation processing must be executed sequentially upon receiving the interrupt request, and it has been extremely difficult to accomplish input/output processing of large amounts of data and high speed calculation processing. In addition, with the conventional method which actuates the specific processing by the interruption from the peripheral I/O unit, the overhead (such as the time required for the storage and return of the PC and PSW) increases, so that the processing speed slows down.

To solve these problems, a dual processor system using a general purpose processor chip and a special purpose processor chip has been proposed. The numeric processing can be executed in the special purpose processor. Since this system has two processors, the load to each processor chip is reduced. The function of each processor is clearly divided, and the efficiency of parallel processing is improved thereby to drastically improve the performance of the system as a whole.

Figure 2:
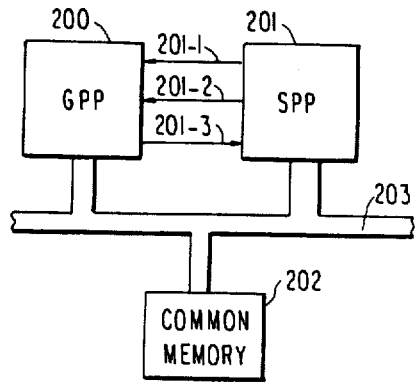
FIG. 2 is a block diagram of a conventional dual processor system which includes a general purpose processor and a special purpose processor.

Referring to FIG. 2, the dual chip processor system has a general purpose processor chip (GPP) 200 and the special purpose processor chip (SPP) 201 which are coupled to a common memory 202, containing a program and data, via a common external bus 203. Each receives simultaneously the same instruction from the memory 202 and each decodes it, respectively. If the instruction is to be used in the GPP 200, the general purpose processor 200 executes the instruction, while the SPP 201 cancels the instruction and enters a wait state. On the other hand, if it is to be used in the specific purpose processor chip 201, the processor 201 informs the general purpose processor 200 of the start of the specific processing by sending a signal 201-1, and thereafter executes the specific processing according to the instruction. During the specific processing, the SPP 201 uses the common bus 203 to access the memory 202 for data read out from the memory 202 or data written into the memory 202 after sending a bus request signal 201-2 to the GPP 200 and receiving a bus grant signal 201-3 returned from the GPP 200.

As described above, the conventional dual processor system shown in FIG. 2 can execute the general processing and the specific processing in the two processor chips, respectively. However, since each instruction must be decoded simultaneously by the two processors, either processor cannot decode the instruction earlier than the other processor. This forces one processor to wait until the other processor terminates the concurrent processing. The general purpose processor 200 checks the signal 201-1 from the special purpose processor 201 and if the special purpose processor 201 is executing the special processing, the general purpose processor 100 must enter a waiting state. Accordingly, even if the processing capacity of each processor is high, parallel processing is not performed.

Figure 3:
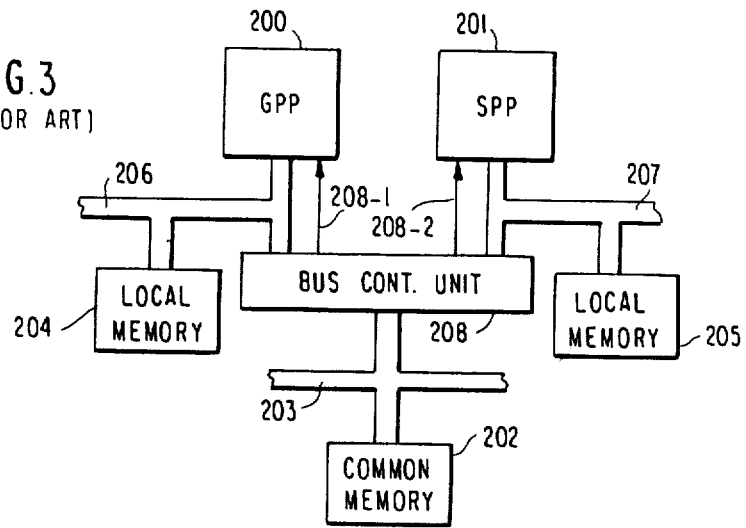
FIG. 3 is a block diagram of another conventional dual processor system.
Figure 13:
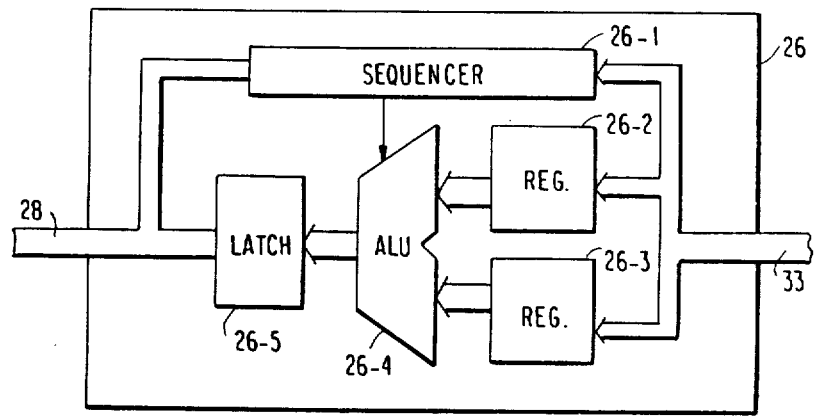
FIG. 13 is a block diagram of an execution unit (EXU) in the special purpose processor of FIG. 5.
Figure 14:
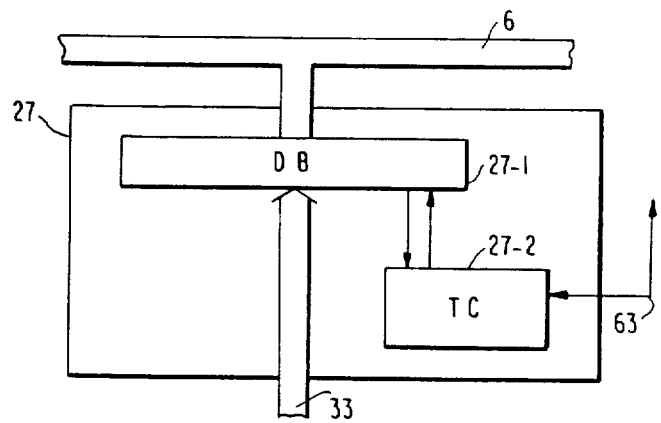
FIG. 14 is a block diagram of a data transfer unit (DTU) in the special purpose processor of FIG. 5.

FIG. 3 shows an improved dual processor system in which the general purpose processor (GPP) 200 and the special purpose processor (SPP) 201 have their local memories 204, 205 connected to local buses 206, 207, respectively, and when the data exchange is to be made between both processors, they make access the common memory 202 connected to the common bus 203 through a bus control unit 208. Both processors 200 and 201 ordinarily execute the instruction by use of their own local busses 206, 207 and local memories 204, 205, and each processor accesses the common memory 202 when the general purpose processor 200 delivers the data to be calculated to the special purpose processor 201 or when the special purpose processor 201 delivers the calculation result to the general purpose processor 200.

Assuming that the general purpose processor 200 writes the data into the common memory 202, the bus control unit 208 first receives the address information from the general purpose processor 200 and judges whether the memory being accessed is the local memory 204 or the common memory 202. When the address is that of the common memory 202, competition of the special purpose processor 201 and the common bus 203 is checked. If the special purpose processor acquires the common bus 203 at that time with reading out the data from the common memory 202 and writing the data into the common memory 202, the bus control unit 208 sends the bus hold signal 208-1 to the general purpose processor 200 and maintains the disconnection between the local bus 206 and the common bus 203. The general purpose processor 200 checks the bus hold signal 208-1 at a predetermined time interval and continues the waiting state until the signal becomes inactive. When the common bus 203 is not used, the bus control unit 208 connects the local bus 206 to the common bus 203 and the general purpose processor 200 can write the data into the common memory 202 through the common bus 203.

In this manner, the two processors shown in FIG. 3 can operate independently, except for the period of access to the common memory, and the system allows parallel processing. However, this system has many drawbacks. The system itself is large in scale and specific hardware such as the bus control unit 208 is necessary for controlling the common bus. Since the bus control unit 208 judges the address every time the memory is accessed, the access speed is low. Since data communication between the processors is made through an external common bus 203, a large quantity of power is necessary for driving the external common bus. In addition, when the data communication quantity between both processors becomes great, a bus neck occurs in the common bus, and the waiting state of one of the processors becomes a serious problem for improving the effect of parallel processing.

Next, the operation of the dual processor system containing the general purpose processor chip and the special purpose processor chip shown in FIG. 3, when applied to the control field which requires a real time operation, will be described.

Here, the general purpose processor 200 as a host processor controls the peripheral devices (not shown) while the special purpose processor 201 as a co-processor executes numeric calculation for the data sent from the peripheral device. The local memory 205 of the special purpose processor 201 stores a plurality of calculation programs. The signals sent from the various sensors are inputted a synchronously to the general purpose processor 200 through the peripheral I/O control unit, and the general purpose processor 200 writes the data necessary for the calculation of the specific processing into the common memory 202 through the common bus 203. The special purpose processor 201 receives the data from the common memory 202, and starts the calculation after all the data to be calculated are prepared in the memory. The calculation result is written into the common memory 202, and the general purpose processor 200 accesses the common memory 202 and transfers the result to the peripheral device.

In the control field where the calculation processing of the asynchronous input data is primarily effected as described above, the special purpose processor must sit idle for extremely long time for the data to be calculated because it starts execution only after all the data are prepared for the calculation. Therefore, although parallel execution is possible, the working ratio of the special purpose processor is limited to a low level.

Referring to FIG. 4, a microcomputer in accordance with a first embodiment of the present invention comprises a general purpose, processor (GPP) 1 for executing general processing in accordance with required programs, a special purpose processor (SPP) 2 for executing specific processing (e.g. numeric calculation processing) in accordance with required programs, a data memory 3 for storing processing data, a program memory 4 for storing instructions necessary for processing the program, and a peripheral input/output unit 5 coupled to at least one peripheral device (not shown). These units are connected to one another by a bus 6. The feature of the present invention is in the use of a data flow processor for the SPP 2.

The general purpose processor 1 has a program counter used to read out instructions from the program memory 4 and controls sequentially the program flow. In response to such an instruction read out of the program memory 4 that is to be executed by the special purpose processor 2, the general purpose processor 1 produces a token by combining sequence control information and data to be calculated and transfers the token to the special purpose processor 2 through the bus 6.

The special purpose processor 2 contains a memory table in which a plurality of instructions are preliminary stored, each instruction being prepared according to the minimum calculation unit of the monadic or dyadic operation. The processor 2 handles each calculation unit as an independent calculation task and performs the processing for each calculation task. The processor 2 is actuated by the token transferred thereto from the general purpose processor 1 via the bus 6. When the token is inputted, one calculation task is executed according to the corresponding instruction which is selected by the sequence control information contained in the token. The result of processing of the calculation task may be used as new data for the next calculation task. In this manner, this procedure is sequentially executed by using a token ring bus. The special purpose processor 2 is designed according to the data flow (data driven) architecture and is used as a co-processor or slave processor.

The execution of the specific processing by the special purpose processor 2 will be explained where the following calculation processing program is executed by way of example:

$$X = A \times B + C \times D \tag{1}$$

The calculation processing program of the formula (1) as the example is divided into the three calculation tasks T1, T2 and T3, and calculation processing is executed for each calculation task:

T1: $A' = A \times B$

T2: $C' = C \times D$

T3: $X = A' + C'$

Since T3 is performed after completion of execution of T1 and T2, it is subordinate in terms of time sequence, but it is irrelevant to T1 and T2 in relation to the data to be calculated, because the only data necessary for T3 are A' and C', and thus it is not necessary for T3 to watch the execution state of T1 and T2 to the extent of observing the input state of A, B, C and D, and the like. Accordingly, T1, T2 and T3 can be regarded as mutually independent calculation tasks.

When the data A and B are transferred from the general purpose processor 1, the calculation task T1 is executed in the processor 2. Similarly, when the data C and D are transferred from the general purpose processor 1, the calculation task T2 is executed in the processor 2. The data A, B, C and D may be randomly entered into the processor 2, and the task T2 may be executed before the execution of the task T1. Only calculation task T3 must wait for execution until A' and C' are prepared after completion of execution of T1 and T2.

A large number of calculation programs consisting of a plurality of calculation tasks are preliminary stored in the processor 102, and each calculation task is executed as soon as the data for it are prepared. The sequence control information in each token designates the calculation tasks for the data corresponding to each portion of sequence control information, so that the data of each calculation task are mutually discriminated.

Referring also to FIG. 5 which shows an internal block diagram of the special purpose processor 2, the function of the processor 2 will be described. The processor 2 contains the following seven units:

(1) an input interface unit (IU) 21 for temporarily storing the token transferred from the general purpose processor 1 via the bus 6;

(2) an address calculation unit (ACU) 22 for producing an address according to the sequence control information, transferring the produced address and the data in the token to a data latch memory (DLM) 23 and further transferring the produced address and the sequence control information to a task queue memory (TRQ) 24;

(3) the data latch memory (DLM) 23 for temporarily storing the transferred data at the address designated by ACU 22 to wait for the other data in the dyadic calculation operation;

(4) the task queue memory (TRQ) 24, which is a first-in first-out memory, for storing the sequence control information relating to the calculation task transferred from the ACU 22 whose data are stored in the DLM 23 and can not be calculated at this time (hereinafter called the "ready state");

(5) a task sequence control unit (TSCU) 25 for designating the calculation mode of the calculation task in an execution unit 26 on the basis of the sequence control information read out from the TRQ 24, selecting the next calculation task which uses the result of the execution of the present calculation task, and adding that control information to the selected task;

(6) the execution unit (EXU) 26 for actually executing the calculation task; and (7) a data transfer unit (DTU) 27 for temporarily storing the final result of the specific processing in the processor 2.

The input interface unit 21 and the data transfer unit 27 are connected to the bus 6, while the other five units 22, 23, 24, 25 and 26 are connected in ring form by token busses 28, 29, 30, 31, 32 and 33. Further, address busses 34 and 35 are used to couple the DLM 23 to the ACU 22 and TSCU 25, respectively.

The calculation operation (specific processing) of the processor 2 now will be described. The interface unit (IU) 21 receives the token from the general purpose processor 1 and transfers the received token to the address calculation unit (ACU) 22 when the data bus 28 is empty. The address calculation unit (ACU) 22 calculates an address of the DLM 23 at which the data in the token is to be stored by use of the sequence control information in the token, outputs the address to the address bus 34 and transfers the data contained in the token to the data latch memory (DLM) 23 through the token bus 29. Further, the sequence control information contained in the token and added with the calculated address is transferred to the FIFO type task queue memory (TRQ) 24 through the parallel token bus 30. The first sequence control information arriving at the TRQ 24 is the first read out of the TRQ 24 and is transferred to the TSCU 25 via the token bus 32. The TSCU 25 accesses the DLM 23 according to the address produced by the ACU 22 and added to the sequence control information via the address bus 35. The data at the accessed address is read out of the DLM 23 and sent to the TSCU 35 through the parallel token bus 31.

In this case, when the calculation task for data at the accessed address is a dyadic operation, the data latch memory 23. examines whether or not the other data already has been stored therein. If the other data already is present in the data latch memory 23, the data latch memory 23 transfers both data to the TSCU 25 simultaneously. On the other hand, if the other data has not yet arrived at the data latch memory (DLM) 23, the accessed, data is not transferred to the TSCU 25 and is retained in the DLM 23, waiting for the arrival of the other data. At this time, the sequence control information is transferred as it is through the token buses 33, 28 and 30 and is entered into the TRQ 24 again.

If the calculation task for the accessed data is a monadic operation, the data latch memory (DLM) 23 transfers the data to the TSCU 25 via the token bus 32 because the calculation task is in the ready state without waiting. The task sequence control unit (TSCU) 25 contains a memory table storing a plurality of calculation modes and designates the calculation mode to be executed according to the control information of the calculation task under the ready state. The data to be calculated are transferred to the execution unit (EXU) 26 through the token bus 23. On the other hand, when the calculation is completed, the task sequence control unit 25 transfers the data as the final calculation result to the data transfer unit (DTU) 27 through the bus 33. The execution unit (EXU) 26 executes the calculation processing designated by the calculation mode supplied from the TSCU 25. After the calculation is completed, the EXU 26 constitutes the token by the sequence control information updated by the task sequence control unit 25 and transfers the token to the address calculation unit 22 through the token bus 28. The data transfer unit (DTU) 27 receives the final calculation result from the task sequence control unit 25 and informs the general purpose processor 1 that processing is complete. The general purpose processor 1 transfers the final calculation result to the data memory 3 through the bus 6.

In the manner described above, a plurality of tokens inputted from the general purpose processor 1 are calculated in accordance with a plurality of calculation tasks with queuing operation. Thus, the general purpose processor 1 can enter randomly unscheduled data into the special purpose processor 2. The calculation result is produced in the processor 2.

FIG. 6 is an internal block diagram of the general purpose processor 1. The processor 1 is basically designed according to von Neumann architecture in, this embodiment and contains a program memory (ROM) 36 for storing instructions for processing a required program, a program counter (PC) 37 to read instructions out of the ROM 36 sequentially, a queue memory 38 used as an instruction register, a microsequencer 39 for storing microprograms, an instruction decoder 40 for decoding instructions, an arithmetic logic unit (ALU) 41, a temporary register 42 for storing the results obtained in the ALU, a data memory (RAM) 43 containing a working register set, an address producing unit 44 and an I/O control unit 45. The system bus 6 is coupled to a first internal bus 48 which is connected to ROM 36 and the queue memory 38. Thus, the queue memory 38 can receive an external instruction through the system bus 6, and the instructions in the ROM 36 can be transferred to the system bus 6. The I/O control unit 45 is coupled to the bus 6 via the first internal bus 48 and has a bus control function as well as a data transfer function. The processor employs a dual bus structure with two busses 49 and 50 separately provided. The RAM 43, which is a dual-port type, is coupled to both busses 49 and 50. The dual busses 49 and 50 are coupled to the first internal bus 48 and a second internal bus 51 via buffers 46 and 47, respectively.

When the specific processing is required, the sequence control information and the data to be calculated are produced and are transferred to the special purpose processor 2 as a token. The sequence control information may be transferred to the system bus 6 through the internal busses 50 and 51, and the data may be transferred to the system bus 6 through the internal busses 49 and 48. Alternatively, the sequence control information and the data may be transferred serially to the system bus 6 via the bus 48. In order to allow this serial transfer, a bus 52 is provided to connect the bus 51 to the bus 48. With this serial transfer, the general purpose processor 1 can be coupled to the data flow type special purpose processor 2 according to a normal bus coupling technique.

Referring also to FIG. 7, the processor 1 prepares the sequence control information containing a table address (TA), a data base pointer (DBP), a source/destination designating bit (S/D), a data length code (DL) and a data format code (DF). The table address (TA) and the data base pointer (DBP) are produced by the address producing unit 44 and used in the address calculation unit (ACU) 22 in the special purpose processor 2 for producing the address to access the DLM 23. The S/D is used to indicate that the data to be calculated in the processor 2 is either source data or destination data. For example, when the S/D is "1", the data is manipulated as source data, while when the S/D is "0", the data is manipulated as destination data. The data length code (DL) indicates the number of bytes of data to be calculated. When the data consists of one byte, the DL is "00", while the DL is "01" for data consisting of two bytes. It is "10" for data of three bytes. The code of DL may be arbitrarily prepared according to the data to be processed. The data format code DF may be as shown in Table 1.

TABLE 1

| DF | Data Format |
|---|---|
| 001 | 16-bit integer |
| 010 | 32-bit integer |
| 110 | 32-bit floating point |
| others | Reserved |

Flow of the sequence control information (TA, DBP, S/D, DL and DF) in the processor 2 now will explained with reference to FIGS. 7 to 14. Sequence control information first is entered into the input interface unit 21 in FIG. 7 through the system bus 6 and is stored in a data buffer (DB) 21-1 therein shown in FIG. 8. The DL among the sequence control information is further entered into a timing controller (TC) 21-2 (FIG. 8). The timing controller 21-2 controls entry of the data according to the DL. That is, when the DL is "01", the TC 21-2 controls the DB 21-1 so as to store two bytes of the data. The bytes are transferred one by one. After all of the data to be processed are stored in the data buffer 21-1, the sequence control information is transferred to the address calculation unit (ACU) 22 shown in FIG. 9 through the bus 28. The information is stored in a tag data buffer (TDB) 22-1. The table address (TA) is applied to a data address table (DAT) 22-2 as an address. The DAT 22-2 has data and a control code (CTL). The data is applied to an adder (ADD) 22-3 together with the data base pointer (DBP. The addition result is transferred to the address bus 34 coupled to the DLM 23 via an address buffer (AB) 22-5 as an effective address designating a location in which the data to be processed is stored. The effective address to be transferred to the DLM is also stored in the TDB 22-1 as a data storage address (DSA). The CTL is transferred to the DLM 23 through the bus 29 and indicates a processing task function as shown in Table 2.

TABLE 2

| CTL | Processing Task Function |
|---|---|
| 00 | Load operation of constant value |
| 01 | Monadic operation |
| 10 | Dyadic operation using constant value |
| 11 | Dyadic operation using queuing |

The S/D bit is also transferred to the DLM 23 through the bus 29 to indicate either source data or destination data. The data format (DF) shown in Table 1 is applied to a timing controller (TC) 22-4 to indicate predetermined timing operation according to the designated format. The sequence control information (TA, DBP, DSA and DL) is transferred to the task queue memory (TRQ) 24 through the bus 30. The data to be processed is directly transferred from the bus 28 through the bus 29 to the DLM 23 together with the CTL and S/D.

The task queue memory 24 has a tag data queue (TDQ) 24-1 of a first-in first-out (FIFO) memory structure and a queue status controller (QSC) 24-2 as shown in FIG. 10. The sequence control information is entered into the TDQ 24-1 through the bus 30. The oldest sequence control information stored in the TDQ 24-1 is firstly derived therefrom and transferred to the task sequence control unit (TSCU) 25 through the bus 32. The queue status controller (QSC) 24-2 checks the status of the TDQ 24-1 and generates a queue overflow control signal (QSCC) when the TDQ 24-1 is filled with the entered information. That is, when the TDQ 24-1 has no empty memory area, an entry of a new sequence control information is stopped by the QSCC signal. The QSCC signal is applied to the timing controller (TC) 22-4 in the ACU 22 (FIG. 9) to stop output of the subsequent control information. Thus, the entry into the TDQ 24-1 is inhibited until the information already stored in the TDQ 24-1 is derived therefrom.

The data latch memory DLM 23 (FIG. 11) has a storage means including a source data area (SDA) 23-2 and a destination data area (DDA) 23-4, each of which has a plurality of storage locations. Each location has a flag bit. That is, the source data area contains a source flag bit $V_s$ 23-1 corresponding to each source data storage location, while the destination data area contains a destination flag bit $V_d$ 23-3 corresponding to each destination data storage location. Both areas are simultaneously accessed by either the address sent from the ACU 22 through the address bus 34 or the address sent from the TSCU 25 through the address bus 35. The address is decoded by an address decoder (AD) 23-5 to designate one of the common storage locations of the both areas SDA and DDA. The read-out $V_s$ and $V_d$ are applied to a memory controller (MC) 23-6 to which the CTL and S/D are also supplied from the bus 29. The memory controller (MC) 23-6 selects either one of SDA and DDA according to the S/D bit when the CTL 29 is "11". For example, when the S/D bit is "0", the SDA is selected and the data on the bus 29 is written at the location designated by the address. Further, the $V_s$ flag bit corresponding to the designated location is set. On the other hand, when the S/D bit is "1", the DDA is selected and the data is written at the location designated by the address. In addition, the $V_d$ flag bit corresponding to the designated location is set. The memory controller (MC) 23-6 further performs set or reset of the flag bit according to the CTL.

When the data is to be read out of the DLM, the read address is applied from the address bus 35 to the AD 23-5 and both of $V_s$ and $V_d$ at the designated location are read out and supplied to the MC 23-6. When both bits are set, the data in the SDA and DDA are both simultaneously read out and transferred to the TSCU 25 through the bus 31. On the other hand, if either one or both of $V_s$ and $V_d$ bits are reset, the data read operation is not enabled. This means that two data to be processed are not prepared. Thus, the MC 23-6 checks the flag bits of $V_s$ and $V_d$ and enables the read operation only when both bits are set.

The task sequence control unit (TSCU) 25 shown in FIG. 12 receives the control information consisting of TA, DBP, DSA and DL from the bus 32. The DSA which has been produced by the ACU 22 is supplied to an address buffer 25-1 and used to access the DLM 23 through the address bus 35. An address counter 25-2 is provided for the address buffer 25-1 for producing the sequential addresses to access a plurality of bytes of data. The table address (TA) is supplied to a task sequence table (TST) 25-3 which produces a new table address (TA'), a new source/destination designating bit (S/D') and a new data length code (DL') to be used in updated sequence control information which in turn indicates a new processing with respect to the concurrent data if necessary and a selection code to be applied to a bus selector (BSL) 25-4. The bus selector 25-4 sends the data from the bus 31 to the execution unit 26 when the select code indicates the EXU 26 or to the data transfer unit (DTU) 27 when the select code indicates the DTU 27, that is, when the data processing is completed. The BSL 25-4 controls the data transfer according to the data length code (DL) supplied thereto.

The execution unit (EXU) 26 (FIG. 13) has a sequencer 26-1 for indicating a calculation mode according to the control information, two registers 26-2 and 26-3, an arithmetic logic unit (ALU) 26-4, and a latch 26-5. The ALU 26-4 executes a calculation (addition, subtraction, multiplication, division, comparison, etc.) according to the calculation mode indicated by the sequencer 26-1 and transfers the calculation result to the bus 28.

The data transfer unit (DTU) 27 (FIG. 14) has a data buffer (DB) 27-1 coupled to the bus 33 at its input and to the system bus 6 at its output for temporarily storing the processing result, and a timing controller (TC) 27-2.

Figure 15:
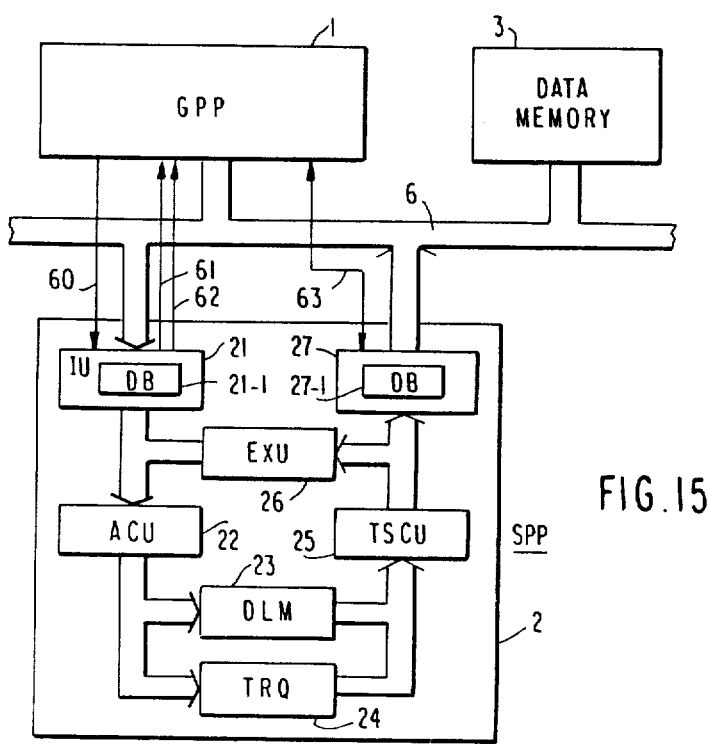
FIG. 15 illustrates an interface between the general purpose processor (GPP) and the special purpose processor (SPP) in the embodiment of the invention.

The interface control of the general purpose processor 1 and the special purpose processor 2 will be described with reference to FIG. 15.

The interface unit (IU) 21 in the special purpose processor 2 has the input data buffer (DB) 21-1 for storing the input token from the general purpose processor 1 while the data transfer unit (DTU) 27 has the output data buffer (DB) 27-1 for storing the processing result of the special purpose processor 2. The following control signals are used in order to control the communication between the general purpose processor 1 and the special purpose processor 2.

In order to transfer the token from the general purpose processor 1 to the special purpose processor 2, the processor 1 applies a token transfer signal 60 which informs the processor 2 that the token is outputted to the bus 6. The signal 60 is generated by the peripheral control unit 45 in the GPP 1 and is received by the timing controller (TC) 21-2 of the IU 21. The timing controller 21-2 activates a signal 61 to inform the general purpose processor 1 that the interface unit 21 of the processor 2 cannot receive the token transferred from the general purpose processor 1. When the token can be received, the TC 21-2 deactivates the signal 61. The processor 1 can acknowledge the token transfer according to the signal 61. The timing controller (TC) 21-1 activates the signal 61 when the QSCC signal is present but deactivates it when the QSCC signal is absent. Alternatively, the QSCC signal may be directly applied to the general purpose processor 1 as a signal 62 from the TRQ so as to directly inform the GPP 1 that the TDQ has been filled and no more control information is accepted. In this case the signal 61 can be omitted.

Further, when the processing result is stored in the data buffer 27-1 of the DTU 27, the TC 27-2 generates a data transfer request signal 63 which is applied to the peripheral control unit 45 of the processor 1. The processor 1 receives the processing result through the bus 6 when the data entry is acceptable by returning a grant signal 63. Though the request signal and the grant signal are transferred bidirectionally on the source signal line, these signals may be separated from each other. Further, the processing result may be sent directly to the data memory 3.

In conjunction with the transfer operation of the token from the general purpose processor 1 to the special purpose processor 2, there are the following two methods, and the general purpose processor 1 can arbitrarily select them in accordance with the state of the processor 2.

(1) The general purpose processor 1 fetches the instruction from the program memory 4 and when the instruction is judged to be such one that commands the specific processing to be executed by the processor 2, the general purpose processor 1 adds the sequence control information designating the calculation task to the data to be processed, whereby the token is prepared. The general purpose processor 1 then generates the token transfer signal 60, outputs the token to the bus 6 and checks the level of the signal 61 from the processor 2. When the signal 61 is active, the general purpose processor 1 is under the waiting state while outputting the token to the bus 6, and repeatedly checks the signal 61. When the signal 61 becomes inactive, it judges that the processor 2 receives the token, and fetches the next instruction from the program memory 4 to execute that instruction simultaneously with the execution of the specific processing by the processor 2.

When the token transfer signal 60 is active, the processor 2 checks the state of the input buffer 21-1 in the interface unit 21, deactivates the signal 61 when the input token buffer 21-1 is empty, and takes the token on the bus 6 into the input token buffer 21-1. When the token remains in the input token buffer 21-1, the processor 2 keeps the signal 61 active until the interface unit 21 transfers the token to the address calculation unit 22.

(2) The general purpose processor 1 checks the state of the signal 62 from the processor 2. When the QSCC signal is present, the general purpose processor 1 suspends the transfer of the token to the processor 2 and executes other processings. After that, it transfers the token again to the processor 2 in the same way as the method described in item (1) above.

In connection with the transfer operation by the general purpose processor 1 of the calculation result of the processor 2 to the data memory 3, when the data transfer unit 27 in the processor 2 receives the final calculation result from the task sequence control unit 25, it requires the general purpose processor 1 to receive the calculation result by using the request signal 63. When accepting the request, the general purpose processor 1 temporarily stops the execution of the present program, receives the calculation result from the output data buffer 27-1 of the data transfer unit 27, and transfers it to the data memory 3 through the bus 6.

In this manner, the processor 2 waits for the calculation result thereinside irrespective of the transfer sequence of the data to be processed which is transferred from the general purpose processor 1, while the general purpose processor 1 need not consider at all timing such as waiting in connection with the transfer sequence of the data to the processor 2 in order to establish the synchronous relation of the instruction execution sequence. Accordingly, the synchronous communication method of the instruction execution between the processor 1 and the processor 2 becomes simple. Further, the processor 2 can execute the input operation of the token, output operation of the calculation result and the calculation processing entirely independently of one another.

Since the interface control and the coupling between the processors 1 and 2 are very easy, the processor 2 can be formed on the same chip as the processor 1 together with the memories 3 and 4 and the peripheral I/O unit 5. Further, the present invention utilizes the processor of a data flow (or driven) control type, in which an instruction is started upon data input, as the special purpose processor and can therefore provide the following advantages:

(1) The special purpose processor has stored therein a plurality of processing programs, and each program is divided into independent tasks so as to execute the processing in the task unit. Accordingly, a plurality of programs can be executed in parallel with one another. There does not exist fundamentally an execution sequence among a plurality of tasks. Rather tasks are sequentially executed as data becomes available. Accordingly, there is hardly any overhead such as waiting for the input of the processing data.

(2) Since the special purpose processor waits for the processing data thereinside in accordance with the sequence control information in the token irrespective of the transfer sequence of the processing data in the token transferred thereto from the general purpose processor and establishes the synchronous relation of the instruction execution sequence, the general purpose processor need not consider at all timing such as waiting in connection with the transfer of the data to the special purpose processor. Accordingly, these general purpose processors have extremely reduced overhead in conjunction with respect to data transfer to the special purpose processor.

In this manner, the present invention can remarkably improve the parallel processing efficiency of the dual processor system by reducing the overhead in connection with the data transfer between the processors. As shown in the upper three waveforms in FIG. 16, the conventional dual processor system in FIG. 2 requires different time periods for the processings $G_1$, $G_2$ in the GPP and those processings $S_1$ and $S_2$ in the SPP with intervals $I_1$, $I_2$, $I_3$ used for data and information transfer. According to the invention, as shown in the lower three waveforms in FIG. 16, the GPP and the SPP can execute the respective processings $G_1$, $G_2$, . . . and $S_1$, $S_2$ . . . at the same time periods with intervals $I_1$, $I_2$, . . . used for data and information transfer therebetween.

In addition, the hardware resources can be utilized more effectively, and the single-chip microcomputer having a drastically improved processing capacity can be provided. The present invention provides great practical significance in accomplishing high speed real time control, particularly in the control field where parallel processing by multiprogramming is a requisite.

FIG. 17 shows a block diagram of another embodiment of a numeric value calculation processor (special purpose processor) 2' for data flow control.

The numeric value calculation processor 2' contains an interface unit 70 which manages the state of the calculation task, a ready state task queue 72 which selectively stores the sequence control information of the token, a data latch memory 71 for storing the data to be calculated, an execution unit 73 for executing the calculation of the task, and a data transfer unit 74 for transferring the final calculation result. The interface unit 70, the ready state task queue 72, the data memory 71 and the execution unit 73 are connected to a token ring bus 75 in which the data move unidirectionally.

The data processing flow in the numeric value calculation processor 2' will be described briefly.

First of all, the general purpose processor 1 adds predetermined control information to the calculation data to prepare the token, and transfers it to the interface unit 70 of the numeric calculation processor 2'. The interface unit 70 transfers the data among the inputted token to the data memory 71, decodes the control information, and discriminates one of the calculation tasks to be executed.

When the calculation task relating to the token is monadic calculation, the calculation task enters the ready state upon receiving the data input, but in the case of the dyadic calculation, the counter-part data is first inputted to the numeric value calculation processor 2' and the interface unit 70 checks whether or not it is transferred to the data memory 71. As a result, if the counterpart data is found to have been transferred first to the data memory 71, the calculation task is in the ready state and if not, the input data waits for the counter-part data in the data memory 71.

When the calculation task enters the ready state by the data input, the interface unit 70 generates the control information designating the calculation in the execution unit 73 and the storage address of the data memory 71 for the calculation data, and transfers the information to the ready state task queue 72.

The execution unit 73 receives the control information from the start of the ready state task queue 72 and the calculation data from the data memory 71 and calculates the task. After the calculation processing is complete, the execution unit 73 outputs the calculation result to the data transfer unit 74 when the calculation result is the final result to be delivered to the general purpose processor 1, or adds the control information designating the next calculation task which uses the calculation result as its input data, to the calculation result and transfers it to the interface unit 70 when the calculation result is an intermediate result to the processing program.

The data transfer unit 74 may transfer the calculation result to the data memory 3 through the bus 6. The DTU 74 may generate an interruption signal upon receipt of the final calculation result, to inform the general purpose processor 1 of the data transfer.

In this manner, the data inputted from the general purpose processor 1 moves on the ring bus 75 while waiting for the counterpart data in the data memory 71, as the calculation data of the predetermined calculation task, and is calculated at the execution unit 73. The calculation result is used as the input data for the next calculation task. This procedure is repeated while the data moves round the ring bus 75 a predetermined number of times, and the final calculation result is transferred by the data transfer unit 74 to the external data memory 3.

In practical application, a plurality of calculation tasks formed by a plurality of calculation processing programs move round the ring data bus 75 while waiting for the counter-part data on the data memory 71. Accordingly, it appears as if a plurality of instructions were simultaneously executed in parallel with one another.

The operation of the overall system of the present invention in the control field will be explained.

The program memory 4 of the general purpose processor 1 stores the input/output processing program with the peripheral I/O unit 5, self-diagnosis program for fail safe, and so forth, and a plurality of calculation processing programs for asynchronous input data are written into the numeric value calculation processor 2' in the form of sequences of calculation tasks.

When the data or signals are inputted from the various sensors to the peripheral I/O unit 5 (FIG. 4), the peripheral I/O unit sends a processing request to the general purpose processor 1. The general purpose processor 1 accepts this request and starts the corresponding processing routine. The general purpose processor 1 receives the data from the peripheral I/O unit 5 and if this input data requires the calculation processing with the asynchronous input data from another peripheral I/O unit 5, the general purpose processor 1 adds a predetermined tag data to the input data and transfers it to the numeric value calculation processor 2'. Then, it shifts to the next processing.

In this manner, the general purpose processor 1 repeats the operations of adding the predetermined tag data to the input data and transferring it to the numeric value calculation processor 2' in conjunction with the calculation processing of the asynchronous input data, but does not need the processing involving the overhead such as waiting for the data input of the counterpart calculation.

On the other hand, upon receiving the calculation data from the general purpose processor 1, the numeric value calculation processor 2' starts the calculation task while waiting for the counter-part data as described already, executes a plurality of instructions in parallel with one another and outputs the final calculation result to the data memory 3.

At the predetermined data output timing to the peripheral I/O unit 5, the general purpose processor 1 reads out the calculation result written by the numerical calculation processor 2' from the data memory 3 and outputs it to the peripheral I/O unit 5.

In this embodiment, the general purpose processor 1 executes the data input/output processing with the peripheral I/O unit 5, the asynchronous input data transfer to the numeric value calculation processor and self-diagnosis processing of the system, while the numeric value calculation processor 2' executes the calculation processing of the asynchronous input data. Thus, both processors employ a clear function dispersion system.

As described above, the present invention constitutes the function dispersion type dual processor system consisting of the general purpose processor and the numeric value calculation processor on a single semiconductor chip, and employs a data flow control system for the numeric value calculation processor. Accordingly, the present invention enables realization of a single-chip microcomputer which can drastically reduce the effective calculation time of the numeric calculation processing of the asynchronous input data and can make real time control in the high end control field without using any particular hardware for an exclusive calculation purpose.

Furthermore, since the present invention constitutes a dual processor system on a single semiconductor chip without using any particular hardware such as a bus arbiter, the present invention can reduce the package area and cost of production in the application system in comparison with the conventional 2-chip dual processor system, and can improve the system reliability.

As described above, the on-chip dual processor system consisting of the general purpose processor and the numeric value calculation processor in accordance with the present invention provides a microcomputer system having extremely high cost performance and extremely high practical utility.

What is claimed is:

1. A microcomputer comprising:
   a first processor;
   a second processor;
   a program memory for storing a program, said program including instructions of a first type to be executed by said first processor and instructions of a second type to be executed by said second processor; and
   a system bus interconnecting said first processor, said second processor and said program memory;
   said first processor including:
      means for executing said first type of instructions;
      means, responsive to said second type of instructions, for producing a token which contains sequence control information representative of a calculation task to be executed by said second processor and data to be processed by said second processor; and
      means for transferring said token to said second processor via said system bus;
   said second processor including:
      input means, coupled to said system bus, for temporarily storing said token;
      a first memory;
      a second memory;
      means, coupled between said input means and said first memory, for writing the data in said token into said first memory;
      means, coupled between said input means and said second memory, for writing the sequence control information in said token into said second memory;
      storage means for storing a plurality of calculation programs each designated by the sequence control information representative of the calculation task to be executed by said second processor;
      means for reading the sequence control information from said second memory;
      means, coupled to said first and second memories and to said sequence control information reading means, for feeding back the read sequence control information to said second memory to restore the read sequence control information therein if said first memory does not contain all data required for executing the calculation program designated by the read sequence control information;
      means, coupled to said first memory and to said sequence control information reading means, for designating one of said calculation programs in response to the read sequence control information if said first memory does contain all data required for executing the calculation program designated by the read sequence control information;
      means for reading data to be processed from said first memory;
      an execution unit for executing the designated calculation program by use of the data read from said first memory and obtaining an execution result; and
      output mean for transferring the execution result from said execution unit to said system bus.

2. The microcomputer as claimed in claim 1, wherein said second memory is a first-in first-out type memory.

3. The microcomputer as claimed in claim 2, wherein said second processor further includes:
   means for producing new sequence control information in response to the sequence control information read from said second memory if said first memory does contain all data required for executing the calculation program designated by the read sequence control information; and
   means for storing said new sequence control information in said second memory.

4. The microcomputer as claimed in claim 3, wherein at least said first processor and said second processor are fabricated on a single semiconductor chip.

5. A microcomputer comprising:
   a first processor executing a program stored in a program memory; and
   a second processor coupled to said first processor via a system bus;
   said first processor producing a token, including sequence control information and data to be processed by said second processor, when said second processor is required to execute any of a plurality of calculation tasks, said token being transferred to said second processor via said system bus;
   said second processor including:
      an input interface unit coupled to said system bus and temporarily storing said token;
      an address calculation unit coupled to said input interface unit via a first bus and producing an address in response to said sequence control information;
      a first memory coupled to said address calculation unit via a second bus and storing said data in a storage location thereof designated by said address;
      a second memory coupled to said address calculation unit via a third bus and storing said sequence control information and said address;
      a sequence control unit coupled to said first memory via a fourth bus and to said second memory via a fifth bus and accessing said first memory by using said sequence control information and said address transferred from said second memory;
   said sequence control unit including:
      storage means for storing a plurality of calculation programs for performing each of said calculation tasks;
      means for designating one of said calculation programs in response to said sequence control information when said first memory contains the data necessary to execute the calculation program designated by said sequence control information; and
      means for restoring said sequence control information into said second memory when said first memory does not contain the data necessary to execute the calculation program designated by said sequence control information;
   said first memory including:
      means for inhibiting access by said sequence control unit when the data necessary to execute the calculation program designated by said sequence control information is not contained in said first memory;
      an execution unit, coupled to said sequence control unit via a sixth bus, for executing an arithmetic operation on the data accessed by said sequence control unit in accordance with the calculation program designated by said sequence control information;
      said execution unit including means, coupled to said first bus, for transferring a result of said arithmetic operation to said address calculation unit via said first bus;
   said address calculation unit including:
      means for storing said result of said arithmetic operation into said first memory via said second bus, said sequence control unit reading said result of said arithmetic operation from said first memory when the execution of the required calculation task is completed; and
      a data transfer unit coupled to said sixth bus and to said system bus for transferring said result of said arithmetic operation to said system bus.

* * * * *